T. E. MURRAY.
VEHICLE WHEEL.
APPLICATION FILED SEPT. 27, 1915.
1,212,799.
Patented Jan. 16, 1917.
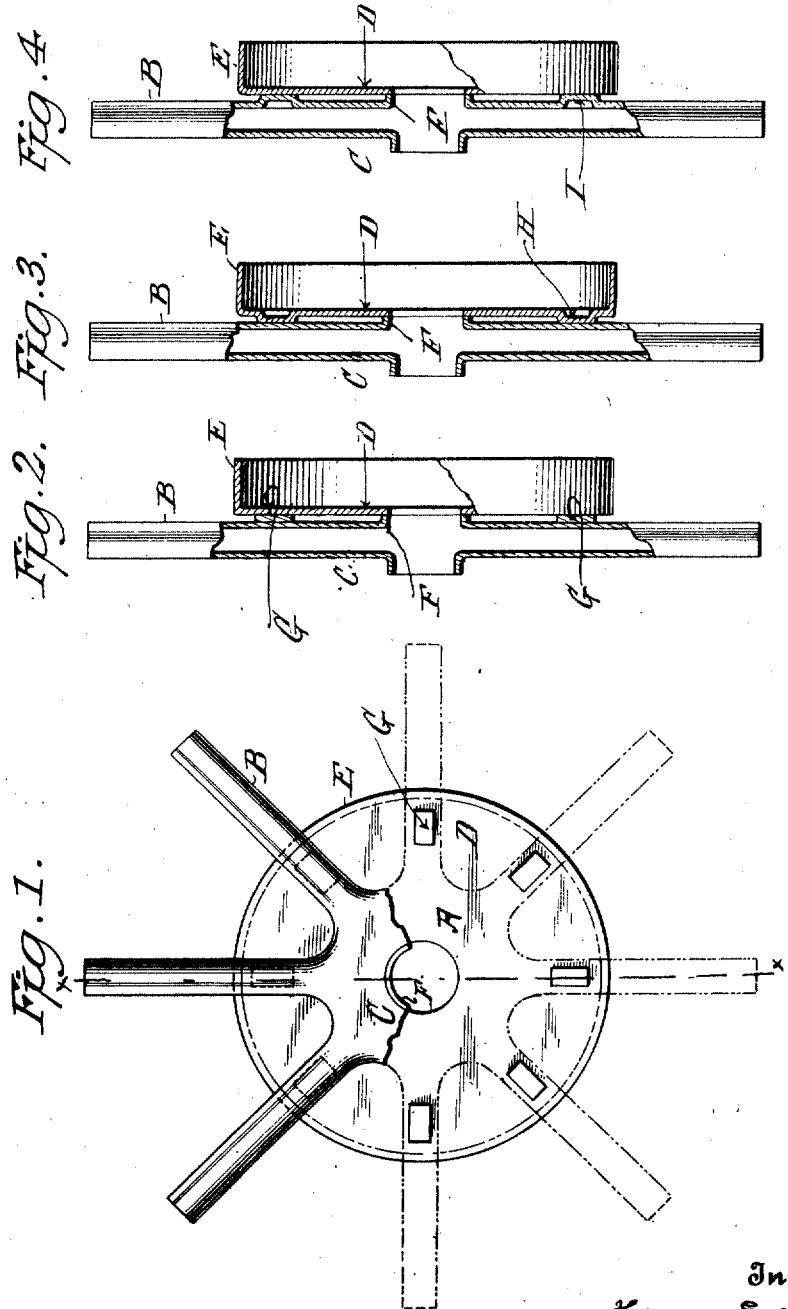
Inventor
Thomas E. Murray
By his Attorney
Park Benjamin

UNITED STATES PATENT OFFICE.

THOMAS E. MURRAY, OF NEW YORK, N. Y.

VEHICLE-WHEEL.

1,212,799.  Specification of Letters Patent.  Patented Jan. 16, 1917.

Application filed September 27, 1915.  Serial No. 52,798.

*To all whom it may concern:*

Be it known that I, THOMAS E. MURRAY, a citizen of the United States, residing at New York, in the county of New York and State of New York, have invented a certain new and useful Improvement in Vehicle-Wheels, of which the following is a specification.

The invention relates to metal vehicle wheels, and consists in the construction, hereinafter set forth, whereby the brake pulley is combined with the wheel body.

The object of the invention is to simplify and strengthen the wheel.

In the accompanying drawings—Figure 1 is an elevation of the wheel body and brake pulley. Fig. 2 is a section thereof on the line $x, x$ of Fig. 1. Figs. 3 and 4 are similar sections of modified forms of my invention.

Similar letters of reference indicate like parts.

The wheel body A is made of sheet metal, and is here shown with tubular spokes B integral with the nave C.

D is the disk of the brake pulley, having the usual flange E for the brake shoe, not shown, and a central opening for the wheel axle. The metal of the brake disk D around said central opening is homogeneously united, preferably by electric welding, to a flange F on the nave C. Between each spoke B and said disk D is interposed a metal spacing piece G, and said spacing pieces are homogeneously united to the disk and to said spokes. Instead of interposing separate spacing pieces G of metal between said disk and said spokes, I may strike up projections H from the metal of the disk, and weld said projections to said spokes, as shown in Fig. 3: or I may strike up a projection I on each spoke and weld all of the projections I to the disk D.

I claim:

1. A metal wheel for vehicles having a hollow sheet metal body, comprising a nave and tubular spokes thereon, a brake disk, and a plurality of spacing blocks interposed between said spokes and said disk.

2. A metal wheel for vehicles having a hollow sheet metal body, comprising a nave and tubular spokes thereon, a brake disk, a flange surrounding said nave opening and welded to said disk, and a plurality of spacing blocks interposed between said spokes and said disk.

In testimony whereof I have affixed my signature in presence of two witnesses.

THOMAS E. MURRAY.

Witnesses:
 GERTRUDE T. PORTER,
 MAY T. MCGARRY.